Patented May 18, 1943

2,319,247

UNITED STATES PATENT OFFICE 2,319,247

OPACIFIER AND PORCELAIN ENAMEL CONTAINING THE SAME

Glenn H. McIntyre, Cleveland Heights, and Monroe J. Bahnsen, Lakewood, Ohio, assignors to Ferro Enamel Corporation, Cleveland, Ohio, a corporation of Ohio No Drawing. Application June 26, 1940, Serial No. 342,526

12 Claims. (Cl. 106—312)

This invention relates as indicated to opacifiers for porcelain enamels and the porcelain enamel containing the same and relates more particularly to an opacifier which is added as a preformed product to the enamel either at the smelter or at the mill where the enamel is ground preparatory to application to the work.

It is a principal object of our invention to provide an opacifier of the character described which is particularly low in cost and formed of materials which are widely available.

Other objects of our invention will appear as the description proceeds.

To the accomplishment of the foregoing and related ends, said invention then comprises the features hereinafter fully described and particularly pointed out in the claims, the following description setting forth in detail certain illustrative embodiments of the invention, these being indicative however, of but a few of the various ways in which the principle of the invention may be employed.

Broadly stated this invention comprises the discovery that a satisfactory opacifier to be used as an addition to porcelain enamels may be prepared by sintering for a length of time and under such conditions as to normally complete the reaction between substituents such that the theoretical amount used should, upon completion of the reaction as stated, yield a product having the general formula, $$XF_4 \cdot YO \cdot ZO_8$$

where X is enough atoms of at least one alkaline metal selected from the first and second groups of the periodic system to satisfy the valency of the four atoms of fluorine; Y is enough atoms of at least one alkaline metal selected from the first and second groups of the periodic system to satisfy the valency of the one atom of oxygen; and Z is enough atoms of at least one element selected from the class consisting of Si, Zr and Ti to satisfy the valency of the eight atoms of oxygen.

In the following table are given a number of specific examples of products falling within the general formula above given, and for convenience in identification of the various components of each complex, they have been respectively identified as I, II, III and IV.

| | I | II | III | IV |
|---|---|---|---|---|
| 1 | $2CaF_2$ | $CaO$ | $4SiO_2$ | |
| 2 | $2CaF_2$ | $CaO$ | $4TiO_2$ | |
| 3 | $2CaF_2$ | $CaO$ | $4ZrO_2$ | |
| 4 | $2CaF_2$ | $CaO$ | $2(ZrO_2 \cdot SiO_2)$ | |
| 5 | $4NaF$ | $Na_2O$ | $4SiO_2$ | |
| 6 | $4NaF$ | $Na_2O$ | $4TiO_2$ | |
| 7 | $4NaF$ | $Na_2O$ | $4ZrO_2$ | |
| 8 | $4NaF$ | $Na_2O$ | $2(ZrO_2 \cdot SiO_2)$ | |
| 9 | $2BaF_2$ | $BaO$ | $4SiO_2$ | |
| 10 | $2CaF_2$ | $BaO$ | $4SiO_2$ | |
| 11 | $4NaF$ | $Na_2O$ | $4TiO_2$ | |
| 12 | $2CaF_2$ | $ZnO$ | $2(ZrO_2 \cdot SiO_2)$ | |
| 13 | $(CaF_2 \cdot 2NaF)$ | $Na_2O$ | $4SiO_2$ | |
| 14 | $(CaF_2 \cdot 2NaF)$ | $(NaKO)$ | $2(ZrO_2 \cdot SiO_2)$ | |
| 15 | $2CaF_2$ | $CaO$ | $2(ZrO_2 \cdot SiO_2) + CaO \cdot TiO_2$ | |
| 16 | $2CaF_2$ | $CaO$ | $2(ZrO_2 \cdot SiO_2) + CaO \cdot ZrO_2$ | |
| 17 | $2CaF_2$ | $CaO$ | $2(ZrO_2 \cdot SiO_2) + CaO \cdot SiO_2$ | |

As an indication of the mode of preparation of the opacifiers of our invention as represented by the specific examples given above, we give below the method of preparation of specific example 4 above:

A raw batch consisting of the following:

| | Parts by weight |
|---|---|
| Whiting—$CaCO_3$ | 100 |
| Fluorspar—$2CaF_2$ | 156 |
| Powdered zircon sand—$2(ZrO_2 \cdot SiO_2)$ | 366 |
| Total | 622 | thoroughly mixed should be sintered at about 2,000° F. for about four hours. After cooling, the material, a white powder, should then be ground in a ball mill to a fineness such that substantially all will pass a 200 mesh sieve. This may be used as a smelter or mill addition opacifier in amounts of from about 1% to about 10%.

Instead of using the theoretical amounts of raw materials which will produce complexes of the above formulas, our invention also contemplates the use of raw materials in such quantity and of such type that the opacifier as formed will be dissolved in a matrix which is compatible with the porcelain enamel in which the opacifier is to be used. Thus, for example, raw materials productive of a titanate, a zirconate, or a silicate may be present either as additions or in excess of that required, and the resultant opacifier will then be dissolved in a matrix which consists of a titanate, zirconate, or silicate respectively. Specific examples of such will be found as examples 15, 16 and 17 respectively in the foregoing table.

The seventeen specific examples which have been given have merely been selected as representative of those covered by the general formula previously stated. It will be understood that combinations of one or more of the alkaline metals selected from the class consisting of the alkaline metals of the first and second groups of the periodic system may be employed in combination in the components I and II in the preparation of other specific compounds in addition to those listed. Complexity of structure is generally found to afford an improvement, and for this reason complexes, in which more than one metal of the classes defined are employed in combination, will generally be found to be of particular utility.

As previously indicated, the improved opacifiers of our invention may be employed as an addition either at the mill or at the smelter. They may be satisfactorily used as a smelter addition, since they are only partly soluble in the glass and do increase the opacity of the final product. Their greatest usefulness, however, will probably be found when used as a mill addition within the percentages above given, since when used as a mill addition, they have a less tendency to dissolve in the glass matrix, and accordingly smaller percentages will be effective to produce like results.

The opacifiers of our invention are useful in porcelain enamels generally and particularly in zirconium-bearing, antimony-free porcelain enamels. As a specific example of the type of porcelain enamel which is included within the general class of zirconium-bearing, antimony-free glazes, the following formula is submitted

| | Per cent |
|---|---|
| Silica sand | 0– 3 |
| Dehydrated borax | 15–19 |
| Feldspar | 24–33 |
| Zircon sand | 19–21 |
| Sodium nitrate | 1– 2 |
| Fluorspar | 4– 8 |
| Sodium fluosilicate | 11–17 |
| Bone ash | 5– 6 |
| Aluminum hydrate | 3– 5 |
| Zinc oxide | 2– 3 |

Porcelain enamels opacified with our improved opacifier will be found to have excellent surface texture, and they will be found to have complete compatability with basic frit compositions used today.

Other modes of applying the principle of the invention may be employed, change being made as regards the details described, provided the features stated in any of the following claims or the equivalents of such be employed.

We therefore particularly point out and distinctly claim as our invention:

1. As an addition opacifier for porcelain enamels the product resulting from the substantially complete sintering of about the theoretical amounts of raw material required for the production of a product having the general formula:

$$XF_4 \cdot YO \cdot ZO_8$$

where X is enough atoms of at least one alkaline metal selected from the first and second groups of the periodic system to satisfy the valency of the four atoms of fluorine; Y is enough atoms of at least one alkaline metal selected from the first and second groups of the periodic system to satisfy the valency of the one atom of oxygen, and Z is enough atoms of at least one element selected from the class consisting of Si, Zr and Ti to satisfy the valency of the eight atoms of oxygen.

2. As a mill addition opacifier for porcelain enamels the product resulting from the substantially complete sintering of about the theoretical amounts of raw material required for the production of a product having the general formula:

$$XF_4 \cdot YO \cdot ZO_8$$

where X is enough atoms of at least one alkaline metal selected from the first and second groups of the periodic system to satisfy the valency of the four atoms of fluorine; Y is enough atoms of at least one alkaline metal selected from the first and second groups of the periodic system to satisfy the valency of the one atom of oxygen, and Z is enough atoms of at least one element selected from the class consisting of Si, Zr and Ti to satisfy the valency of the eight atoms of oxygen.

3. As a new addition opacifier for porcelain enamels comprising a preformed product having the general formula:

$$XF_4 \cdot YO \cdot ZO_8$$

where X is enough atoms of at least one alkaline metal selected from the first and second groups of the periodic system to satisfy the valency of the four atoms of fluorine; Y is enough atoms of at least one alkaline metal selected from the first and second groups of the periodic system to satisfy the valency of the one atom of oxygen, and Z is enough atoms of at least one element selected from the class consisting of Si, Zr and Ti to satisfy the valency of the eight atoms of oxygen.

4. As a mill addition opacifier for porcelain enamels comprising a preformed product having the general formula:

$$XF_4 \cdot YO \cdot ZO_8$$

where X is enough atoms of at least one alkaline metal selected from the first and second groups of the periodic system to satisfy the valency of the four atoms of fluorine; Y is enough atoms of at least one alkaline metal selected from the first and second groups of the periodic system to satisfy the valency of the one atom of oxygen, and Z is enough atoms of at least one element selected from the class consisting of Si, Zr and Ti to satisfy the valency of the eight atoms of oxygen.

5. As a smelter addition opacifier for porcelain enamels comprising a preformed product having the general formula:

$$XF_4 \cdot YO \cdot ZO_8$$

where X is enough atoms of at least one alkaline metal selected from the first and second groups of the periodic system to satisfy the valency of the four atoms of fluorine; Y is enough atoms of at least one alkaline metal selected from the first and second groups of the periodic system to satisfy the valency of the one atom of oxygen, and Z is enough atoms of at least one element selected from the class consisting of Si, Zr and Ti to satisfy the valency of the eight atoms of oxygen.

6. As a new addition opacifier for porcelain enamels comprising a preformed product having the general formula:

$$2CaF_2 \cdot CaO \cdot 2(ZrO_2 \cdot SiO_2)$$

7. As a new addition opacifier for porcelain enamels comprising a preformed product having the general formula:

$$2CaF_2 \cdot ZnO \cdot 2(ZrO_2 \cdot SiO_2)$$

8. As an addition opacifier for porcelain enamels the product resulting from the substantially complete sintering of about the theoretical amounts of raw material required for the production of a product having the general formula:

$$XF_4 \cdot YO \cdot ZO_8$$

where X is enough atoms of at least one alkaline metal selected from the first and second groups of the periodic system to satisfy the valency of the four atoms of fluorine; Y is enough atoms of at least one alkaline metal selected from the first and second groups of the periodic system to satisfy the valency of the one atom of oxygen, and Z is enough atoms of at least one element selected from the class consisting of Si, Zr and Ti to satisfy the valency of the eight atoms of oxygen, said opacifier dissolved in a matrix compatible with the porcelain enamel in which such opacifier is to be used.

9. As an addition opacifier for porcelain enamels the product resulting from the substantially complete sintering of about the theoretical amounts of row material required for the production of a product having the general formula:

$$XF_4 \cdot YO \cdot ZO_8$$

where X is enough atoms of at least one alkaline metal selected from the first and second groups of the periodic system to satisfy the valency of the four atoms of fluorine; Y is enough atoms of at least one alkaline metal selected from the first and second groups of the periodic system to satisfy the valency of the one atom of oxygen, and Z is enough atoms of at least one element selected from the class consisting of Si, Zr and Ti to satisfy the valency of the eight atoms of oxygen, such opacifier dissolved in a titanate matrix.

10. As an addition opacifier for porcelain enamels the product resulting from the substantially complete sintering of about the theoretical amounts of raw material required for the production of a product having the general formula:

$$XF_4 \cdot YO \cdot ZO_8$$

where X is enough atoms of at least one alkaline metal selected from the first and second groups of the periodic system to satisfy the valency of the four atoms of fluorine; Y is enough atoms of at least one alkaline metal selected from the first and second groups of the periodic system to satisfy the valency of the one atom of oxygen, and Z is enough atoms of at least one element selected from the class consisting of Si, Zr and Ti to satisfy the valency of the eight atoms of oxygen, such opacifier dissolved in a zirconate matrix.

11. As an addition opacifier for porcelain enamels the product resulting from the substantially complete sintering of about the theoretical amounts of raw material required for the production of a product having the general formula:

$$XF_4 \cdot YO \cdot ZO_8$$

where X is enough atoms of at least one alkaline metal selected from the first and second groups of the periodic system to satisfy the valency of the four atoms of fluorine; Y is enough atoms of at least one alkaline metal selected from the first and second groups of the periodic system to satisfy the valency of the one atom of oxygen, and Z is enough atoms of at least one element selected from the class consisting of Si, Zr and Ti to satisfy the valency of the eight atoms of oxygen, such opacifier dissolved in a silicate matrix.

12. A porcelain enamel opacified by the addition thereto of a preformed product having the general formula:

$$XF_4 \cdot YO \cdot ZO_8$$

where X is enough atoms of at least one alkaline metal selected from the first and second groups of the periodic system to satisfy the valency of the four atoms of fluorine; Y is enough atoms of at least one alkaline metal selected from the first and second groups of the periodic system to satisfy the valency of the one atom of oxygen, and Z is enough atoms of at least one element selected from the class consisting of Si, Zr and Ti to satisfy the valency of the eight atoms of oxygen.

GLENN H. McINTYRE.
MONROE J. BAHNSEN.